United States Patent
Wang et al.

(10) Patent No.: US 10,429,702 B2
(45) Date of Patent: Oct. 1, 2019

(54) PIXEL STRUCTURE, ARRAY SUBSTRATE AND DISPLAY APPARATUS

(71) Applicants: BOE TECHNOLOGY GROUP CO., LTD., Beijing (CN); CHONGQING BOE OPTOELECTRONICS TECHNOLOGY CO., LTD., Chongqing (CN)

(72) Inventors: Rui Wang, Beijing (CN); Haijun Qiu, Beijing (CN); Fei Shang, Beijing (CN); Jaikwang Kim, Beijing (CN); Shaoru Li, Beijing (CN); Rikun Jiang, Beijing (CN)

(73) Assignees: BOE TECHNOLOGY GROUP CO., LTD., Beijing (CN); CHONGQING BOE OPTOELECTRONICS TECHNOLOGY CO., LTD., Chongqing (CN)

( * ) Notice: Subject to any disclaimer, the term of this patent is extended or adjusted under 35 U.S.C. 154(b) by 0 days.

(21) Appl. No.: 15/518,346

(22) PCT Filed: Oct. 11, 2016

(86) PCT No.: PCT/CN2016/101792
§ 371 (c)(1),
(2) Date: Apr. 11, 2017

(87) PCT Pub. No.: WO2017/148153
PCT Pub. Date: Sep. 8, 2017

(65) Prior Publication Data
US 2019/0094634 A1 Mar. 28, 2019

(30) Foreign Application Priority Data
Feb. 29, 2016 (CN) .......................... 2016 1 0113171

(51) Int. Cl.
*G02F 1/1343* (2006.01)
*G02F 1/1337* (2006.01)
(Continued)

(52) U.S. Cl.
CPC .. *G02F 1/134336* (2013.01); *G02F 1/133514* (2013.01); *G02F 1/133707* (2013.01);
(Continued)

(58) Field of Classification Search
CPC .......................................... G02F 2001/134345
See application file for complete search history.

(56) References Cited

U.S. PATENT DOCUMENTS

2013/0120680 A1* 5/2013 Sun .................. G02F 1/1368
349/43
2015/0070611 A1* 3/2015 Shima ............... G02F 1/133753
349/42

OTHER PUBLICATIONS

1st Office Action dated Feb. 26, 2018 in CN201610113171.4.
International Search Report and Written Opinion dated Dec. 30, 2016 in PCT/CN2016/101792.

* cited by examiner

*Primary Examiner* — Raj R Gupta
(74) *Attorney, Agent, or Firm* — Syncoda LLC; Feng Ma

(57) ABSTRACT

The present disclosure provides a pixel structure, an array substrate and a display apparatus, aiming at achieving good display effects in all viewing directions and improved viewing angles. The pixel structure comprises a plurality of transparent electrodes, which are arranged in columns and each transparent electrode corresponds to a subpixel. Each transparent electrode comprises at least two sub-electrode portions, and each sub-electrode portion is provided with a plurality of slits. The plurality of transparent electrodes are arranged such that: slits in substantially a same column of sub-electrode portions have at least two different extending
(Continued)

directions to thereby substantially reduce alternating light and dark stripes from some viewing angles in the same column during display; and that slits in substantially a same row of sub-electrode portions have at least two different extending directions to thereby substantially reduce alternating light and dark stripes from some viewing angles in the same row during display.

18 Claims, 4 Drawing Sheets

(51) Int. Cl.
     *G02F 1/1335*    (2006.01)
     *G02F 1/1362*    (2006.01)
     *G02F 1/1368*    (2006.01)

(52) U.S. Cl.
     CPC .. *G02F 1/134309* (2013.01); *G02F 1/136286* (2013.01); *G02F 1/1368* (2013.01); *G02F 2001/134345* (2013.01); *G02F 2201/122* (2013.01); *G02F 2201/123* (2013.01); *G02F 2201/52* (2013.01)

PIXEL STRUCTURE, ARRAY SUBSTRATE AND DISPLAY APPARATUS

CROSS-REFERENCE TO RELATED APPLICATION

The present application claims priority to Chinese Patent Application No. 201610113171.4 filed on Feb. 29, 2016, the disclosure of which is hereby incorporated by reference in its entirety.

TECHNICAL FIELD

The present disclosure relates generally to the field of display technologies, and more specifically to a pixel structure, an array substrate, and a display apparatus.

BACKGROUND

The working principle of a liquid crystal display is that the rotating angles of liquid crystal molecules are altered by adjusting the magnitude of electric fields in subpixels to thereby change the light transmittance.

Due to the optical anisotropy of liquid crystal molecules, different images may be seen by users at different viewing angles. The brightness level gradually decreases from the viewing direction that is parallel to the short axes of the liquid crystal molecules to the viewing direction that is parallel to the long axes of the liquid crystal molecules.

Moreover, if the viewing direction is the same as the direction of the long axes of the liquid crystal molecules, the color is biased toward blue; and if the viewing direction is the same as the direction of the short axes of the liquid crystal molecules, the color is biased toward yellow.

SUMMARY

The purposes of the present disclosure are to provide a pixel structure, an array substrate and a display apparatus, so as to achieve good display effects in all viewing directions, and to have improved viewing angles.

In one aspect, a pixel structure is disclosed. The pixel structure comprises a plurality of transparent electrodes, which are arranged in columns and each transparent electrode corresponds to a subpixel. Each transparent electrode comprises at least two sub-electrode portions, and each sub-electrode portion is provided with a plurality of slits. The plurality of transparent electrodes are arranged such that:

Slits in substantially a same column of sub-electrode portions have at least two different extending directions to thereby substantially reduce alternating light and dark stripes from some viewing angles in the same column during display; and that:

Slits in substantially a same row of sub-electrode portions have at least two different extending directions to thereby substantially reduce alternating light and dark stripes from some viewing angles in the same row during display.

Herein rows and columns are arbitrary and are relative to each other. There are no limitations herein.

In some embodiments of the pixel structure, the plurality of transparent electrodes can be arranged in pairs of columns, configured such that in each pair of columns, a first transparent electrode in a first column and a second transparent electrode in a second column on a same row form a corresponding pair of transparent electrodes. Herein slits in substantially a same row of sub-electrode portions in the first transparent electrode and in the second transparent electrode can have at least two different extending directions.

In each corresponding pair of transparent electrodes, the first transparent electrode and the second transparent electrode can have a mirror symmetry along a direction of columns. Yet the first transparent electrode and the second transparent electrode do not need to have a mirror symmetry along the direction of columns, and other embodiments are possible.

In some of the above embodiments of the pixel structure, every two adjacent pairs of columns of transparent electrodes can be arranged in a staggered configuration.

In each corresponding pair of transparent electrodes, the first transparent electrode and the second transparent electrode together can form a polygon, which can be a hexagon, a diamond, a pentagon, or an octagon. Other polygons are also possible and there are no limitations herein.

In some preferred embodiments, the polygon can be a hexagon; each transparent electrode can comprise two sub-electrode portions, aligned in a column; slits in each sub-electrode portion extend in a same direction. Additionally in each transparent electrode, slits in the two sub-electrode portions have extending directions in mirror symmetry along a direction of rows.

In some embodiments of the pixel structure, in each transparent electrode, slits in one of the two sub-electrode portions can be correspondingly connected to slits in another of the two sub-electrode portions in a one-to-one relationship.

Slits in the first transparent electrode and slits in the second transparent electrode can further be in mirror symmetry along a direction of columns.

The hexagons together can form a periodic structure, configured such that any two neighboring sub-electrode portions respectively from two staggered neighboring hexagons on two adjacent columns are on a same row. Slits in each sub-electrode portion of each transparent electrode have an extending direction in parallel to sides of the each sub-electrode portion.

The pixel structure as described above can further comprise a plurality of gate lines and a plurality of data lines. Each gate line extends in a direction of a column and corresponds to a transparent electrode in the column; and each data line can take a shape of a folded line, extending in a direction of a row and running along borders of every two staggered neighboring hexagons in the row. Every two gate lines can be disposed between, and can be electrically coupled to, the two adjacent columns of transparent electrodes in each column of hexagons.

The pixel structure can further include a plurality of thin film transistors, and each thin film transistor corresponds to a transparent electrode. For each thin-film transistor, a gate electrode can be electrically coupled to a corresponding gate line; a source electrode can be electrically coupled to a corresponding transparent electrode; and a drain electrode can be electrically coupled to a corresponding data line.

In the pixel structure disclosed herein, the plurality of transparent electrode can each comprises ITO.

In a second aspect, the present disclosure further provides an array substrate, which includes the pixel structure according to any one of embodiments as described above.

In a second aspect, the present disclosure further provides a display apparatus, which comprises the array substrate as described above.

In some embodiments, the display apparatus can further include a color film substrate, which is disposed over the array substrate. The color film substrate can comprise a plurality of color resistance blocks, which correspond to the plurality of transparent electrodes in a one-to-one relationship.

In some of the above embodiments, each color resistance block and a corresponding transparent electrode can have a substantially same shape, and the color resistance blocks corresponding to a same column of transparent electrodes can be substantially identical in color.

Other embodiments can become obvious for those of ordinary skills in the art based on the embodiments as described above.

BRIEF DESCRIPTION OF THE DRAWINGS

To more clearly illustrate the embodiments of the disclosure, the following is a brief description of the drawings, which are for illustrative purpose only. For those of ordinary skills in the art, other drawings of other embodiments can become apparent based on these drawings.

DETAILED DESCRIPTION

In the following, with reference to the drawings of various embodiments disclosed herein, the technical solutions of the embodiments of the disclosure will be described in a clear and fully understandable way. It is obvious that the described embodiments are merely a portion but not all of the embodiments of the present disclosure. Based on the described embodiments of the disclosure, those ordinarily skilled in the art can obtain other embodiment(s), which come(s) within the scope sought for protection by the disclosure.

Figure 1:
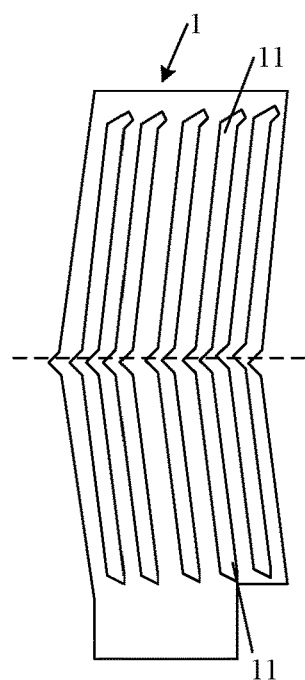
FIG. 1 is a structural diagram of a pixel electrode in the prior art.
Figure 2:
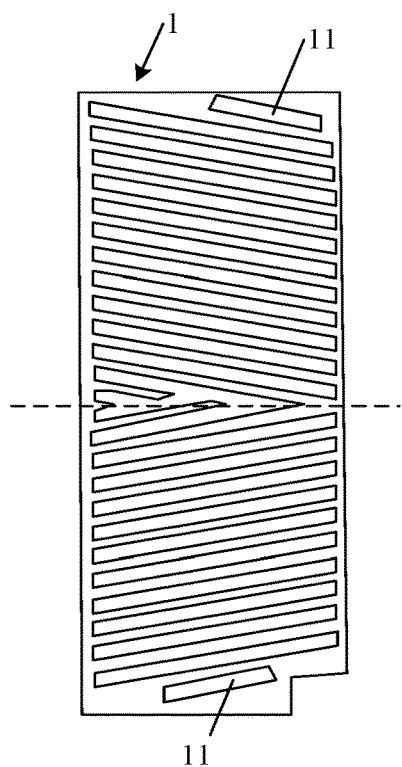
FIG. 2 is a structural diagram of another pixel electrode in the prior art.

In order to reduce the color bias and improve viewing angles, current technologies generally adopt a pixel electrode with a dual-domain structure. As shown in FIG. 1 and FIG. 2, the pixel electrode 1 according to prior art is divided into two portions (the portion above the dotted line and the portion below the dotted line).

A plurality of slits 11 are arranged in the two portions respectively. The slits 11 in the two portions extend in different directions so that the subpixel where the pixel electrode 1 is located can be divided into two subdomains corresponding to the two portions of the pixel electrode 1, and the liquid crystal molecules in the two subdomains are tilted in different directions.

As such, if the viewing direction is the same as the direction of the long axes of the liquid crystal molecules in one subdomain in the subpixel, which leads to lower brightness and a color bias toward blue, the viewing direction in the other subdomain is different from the direction of the long axes of the liquid crystal molecules, thus the overall brightness and the color bias of the subpixel can be improved. Accordingly, the viewing effects at different viewing angles tend to be consistent.

However, if the area of each subpixel is large, among the same row of subpixels, the liquid crystal molecules corresponding to the first half row of subpixels and those corresponding to the second half row of subpixels tilt in different directions. In certain viewing directions (for instance, the viewing direction is the same as the direction of the short axes of the first half row of the liquid crystal molecules, but is different from the direction of the short axes of the second half row of the liquid crystal molecules), the display effects of the first half row of subpixels and the second half row of subpixels are different.

In order to solve the above mentioned issues, the present disclosure provides a pixel structure, an array substrate, and a display apparatus.

In one aspect, a pixel structure is disclosed. The pixel structure comprises a plurality of transparent electrodes, which are arranged in columns and each transparent electrode corresponds to a subpixel. Each transparent electrode comprises at least two sub-electrode portions, and each sub-electrode portion is provided with a plurality of slits. The plurality of transparent electrodes are arranged such that:

Slits in substantially a same column of sub-electrode portions have at least two different extending directions to thereby substantially reduce alternating light and dark stripes from some viewing angles in the same column during display; and that:

Slits in substantially a same row of sub-electrode portions have at least two different extending directions to thereby substantially reduce alternating light and dark stripes from some viewing angles in the same row during display.

Figure 3:
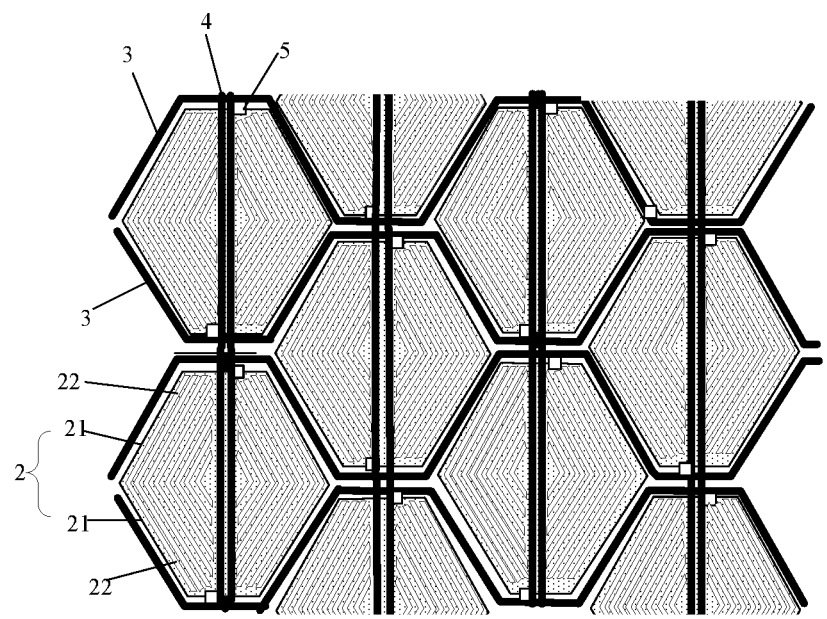
FIG. 3 is a partial view of a pixel structure according to some embodiments of the present disclosure.
Figure 4:
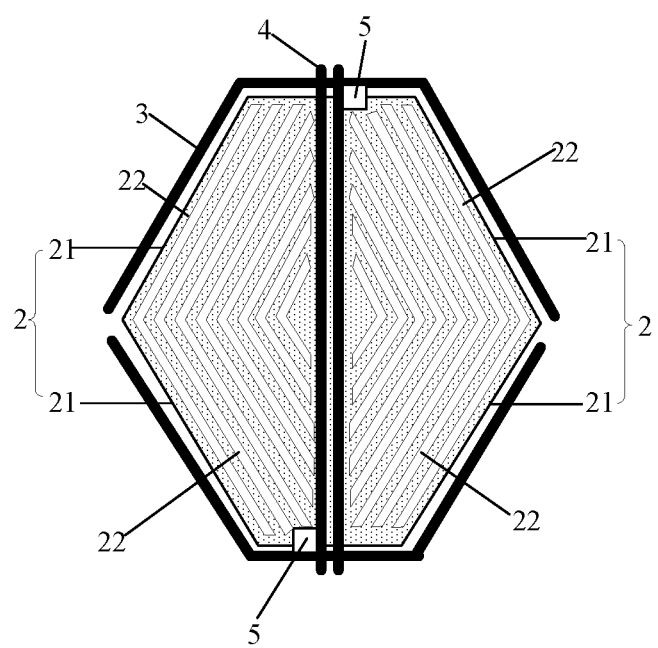
FIG. 4 is a structural diagram of two adjacent subpixels according to some embodiments of the present disclosure.

A pixel structure according some embodiments of the present disclosure is provided herein, as illustrated in FIG. 3 and FIG. 4. As shown in the figures, the pixel structure comprises a plurality of subpixels. Transparent electrodes 2 are disposed in each of the plurality of subpixels. Each transparent electrode 2 comprises at least two sub-electrode portions 21, arranged in the column direction. A plurality of slits 22 are arranged in each of the sub-electrode portions 21. The slits 22 in two adjacent sub-electrode portions 21 in the same column extend in different directions, and the slits 22 in at least one row of the sub-electrode portions 21 have at least two different extending directions.

It can be appreciated that each of the transparent electrodes 2 comprises at least two sub-electrode portions 21, thus the row number of the sub-electrode portions 21 is different from the row number of the subpixels. If the plurality of subpixels are arranged in multiple rows and columns and each of the transparent electrodes 2 comprises two sub-electrode portions 21, one row of transparent electrodes 2 comprises two rows of sub-electrode portions 21.

In some embodiments of the present disclosure, the transparent electrodes 2 are each of a multi-domain structure. The slits 22 in the two sub-electrode portions 21 of each transparent electrode extend in different directions, and as such, in the same subpixel, the directions of the electric fields in the area where the two sub-electrode portions 21 are located are also different, and as such the orientations of the liquid crystal molecules in the area where the two sub-electrode portions 21 are located are also different.

If the viewing direction is parallel to the long axes of the liquid crystal molecules in the area where one of the sub-electrode portions 21 is located, the long axes of the liquid crystal molecules in the area where the other sub-electrode portion 21 is located are not parallel to the viewing angle. As a consequence, an average brightness level of the two areas is seen in this viewing direction, the overall chrominance of the subpixels tends to become balanced through the averaging of the chrominance of the two areas, and the color bias is reduced.

In addition, if the subpixels in the column direction have a large size, because the directions of the electric fields in the two areas in the subpixels are different, the two areas in the subpixels differ in brightness and chrominance. Although human eyes are not able to tell the difference of the display between the two areas in a single subpixel, different display effects (i.e., two rows with different levels of brightness are formed at the location of one row of subpixels) of the areas where the two rows of sub-electrode portion 21 are located can be seen in some viewing directions where the plurality of slits 22 of the sub-electrode portions 21 in the same row extend in the same directions.

In the pixel structure described in the above embodiments, because the slits 22 in at least one row of sub-electrode portions 21 has at least two different directions, if the viewing direction is parallel to the long axes of the liquid crystal molecules corresponding to some of the sub-electrode portions 21 of this row, the viewing direction is not parallel to the long axes of the liquid crystal molecules corresponding to some other sub-electrode portions 21.

As such, the overall brightness level of the area where the sub-electrode portions 21 of this row is located is not too low, and the crossing stripes as seen in some viewing directions are thereby also reduced. As a result, good display effects can be achieved in all the viewing directions, and the viewing angle is thus improved.

In some preferred embodiments, the slits 22 in each row of the sub-electrode portions 21 have at least two different extending directions, so that the corresponding brightness level of each row of sub-electrode portions 21 is not too low in any viewing directions, the brightness level difference between every two adjacent rows is reduced, and the alternating bright and dark crossing stripes are thereby prevented from appearing on a display panel.

Herein the description that "the slits 22 in a row of the sub-electrode portions 21 have at least two different extending directions" can be that the slits 22 in each of the sub-electrode portions 21 have at least two different extending directions. It can also be that the slits 22 in the same sub-electrode portion 21 have the same extending directions, and that this row at least comprises two types of sub-electrode portions 21, and the extending directions of the slits 22 in different types of sub-electrode portions 21 are different.

When electric fields in different directions are formed in the same subpixel, disordered rotation is prone to occur for the liquid crystal molecules at the boundaries of different electric fields, which affects the light transmittance. Therefore, the light transmittance will be reduced if there are a large number of electric fields having different directions in the same subpixel.

To guarantee the light transmittance, in some preferred embodiments, each of the transparent electrodes 2 comprise two sub-electrode portions 21, the plurality of slits 22 in the same sub-electrode portion 21 extend in the same directions, and the slits 22 in the two sub-electrode portions 21 of the same transparent electrode 2 are in mirror symmetry.

As for the extending directions of the slits 22 in the plurality of sub-electrode portions 21 in a same row, the extending directions of the slits 22 in any two adjacent sub-electrode portions 21 can be different.

Alternatively, the plurality of sub-electrode portions 21 can be divided into multiple sets, each set comprising at least two continuously arranged sub-electrode portions 21, and the slits 22 in each set of sub-electrode portions 21 extend in the same directions. If there are a large number of sub-electrode portions 21 in each set, the alternating light and dark stripes can be easily seen in a same row in some directions.

To prevent this phenomenon, in some preferred embodiments, as shown in FIG. 3, in any row of sub-electrode portions 21 arrayed in a preset direction, the extending directions of the slits 22 in the $n^{th}$ sub-electrode portion 21 are different from the extending directions of the slits 22 in the $(n+1)^{th}$ or $(n-1)^{th}$ sub-electrode portion 21, where n is an integer greater than one and smaller than the total number of sub-electrode portions 21 in the row.

In other words, for any sub-electrode portion 21, the extending directions of the slits 22 in the sub-electrode portion 21 can be different from the extending directions of the slits 22 in the sub-electrode portion 21 on the left or right side. In this case, when the brightness to be displayed in the area corresponding to the same row is uniform, the orientations of the liquid crystal molecules corresponding to the $n^{th}$ sub-electrode portion 21 are different from the orientations of the liquid crystal molecules corresponding to the $(n-1)^{th}$ or $(n+1)^{th}$ sub-electrode portion 21.

As such, when the viewing direction is parallel to the long axes of the liquid crystal molecules corresponding to the $n^{th}$ sub-electrode portion 21, the display brightness at the $n^{th}$ sub-electrode portion 21 is relatively low when viewing from this direction. However, as the viewing direction is not parallel to the long axes of the liquid crystal molecules corresponding to the $(n+1)^{th}$ or $(n-1)^{th}$ sub-electrode portion 21, the display brightness at the $(n+1)^{th}$ or $(n-1)^{th}$ sub-electrode portion 21 is relatively high when viewing from this direction, the brightness at the $n^{th}$ sub-electrode portion 21 is thereby compensated, and the alternating light and dark stripes at one row of sub-electrode portion 21 can thereby be prevented, and the display effects are thereby improved. The "preset direction" can be left-to-right or right-to-left as shown in FIG. 3.

In some preferred embodiments, in any row of sub-electrode portions 21 arrayed in the preset direction, the slits 22 in the $n^{th}$ sub-electrode portion 21 and the slits 22 in the $(n+1)^{th}$ or $(n-1)^{th}$ sub-electrode portion 21 are in mirror symmetry. In other words, the slits 22 in any sub-electrode portion 21 as shown in FIG. 3 and the slits 22 in the sub-electrode portion 21 on the left or right side are in mirror symmetry. The brightness distribution in the same row is thus more uniform in any viewing direction.

As shown in FIG. 4, in two adjacent sub-electrode portions 21 of the same transparent electrode 2, the plurality of slits 22 in one sub-electrode portion 21 correspond to the plurality of slits 22 in the other sub-electrode portion 21 in a one-to-one relationship. and are connected, In some preferred embodiments, as shown in FIG. 3 and FIG. 4, in the preset direction (the direction from left to right or the direction from right to left as shown in FIG. 3), the plurality of subpixels in the $m^{th}$ column correspond to the plurality of subpixels in the $(m+1)^{th}$ column in a one-to-one relationship, and the two transparent electrodes 2 of each two corresponding subpixels can form a polygon. Accordingly, a polygonal area can be formed by each two corresponding subpixels. This feature is advantageous for manufacturing irregularly shaped displays that meet special requirements, such as polygonal displays and round displays.

In the present disclosure, as shown in FIG. 3 and FIG. 4, the polygons comprise hexagonal structures and can also comprise diamond structures, pentagonal structures, octagonal structures, and the like.

In some preferred embodiments, as shown in FIG. 3, every two adjacent columns of the polygons are arranged in a staggered configuration. That is, if each of the transparent electrodes 2 comprises two sub-electrode portions 21, among two adjacent columns of subpixels, the two sub-electrode portions 21 of the same transparent electrode 2 and the two sub-electrode portions 21 of two neighboring subpixels are respectively arranged in the same row. The subpixels thereby can be arranged more closely, which is advantageous for manufacturing round displays or other irregularly shaped displays and the aperture ratio can thus be increased. If the polygons are hexagonal structures, the pixel structure is shaped like a honeycomb.

As shown in FIG. 3 and FIG. 4, the pixel structure further comprises a plurality of gate lines 4 and a plurality of data lines 3, and the gate lines 4 and the data lines 3 are intersected and insulated from one another, so that the plurality of subpixels can be defined. The subpixels and the corresponding transparent electrodes 2 are matched in shape. The data lines 3 are each of a folded line structure. The gate lines 4 extend in the column direction, and each gate line 4 corresponds to one column of the subpixels. Two gate lines 4 corresponding to the subpixels where the two transparent electrodes forming one polygon are located are both disposed between the two transparent electrodes 2.

If the polygons are diamond structures, each subpixel is shaped like a half diamond. If the polygons are hexagonal structures, each subpixel is shaped like a half hexagon. As shown in FIG. 3, the plurality of data lines 3 jointly define a plurality of hexagonal areas which correspond to the plurality of hexagonal structures in a one-to-one relationship. The hexagonal structures are disposed in the corresponding hexagonal areas. The hexagonal areas are arranged in multiple columns, and two gate lines 4 are arranged in each column of hexagonal areas so that one column of hexagonal areas can be divided into two columns of subpixels.

As shown in FIG. 4, the slits 22 in the sub-electrode portions 21 are parallel to the sides of the sub-electrode portion 21 that are opposing to the corresponding gate lines 4.

Specifically, as shown in FIG. 3 and FIG. 4, thin film transistors 5 corresponding to the transparent electrodes 2 are further arranged in the subpixels. The gate electrodes of the thin film transistors 5 are connected to the gate lines 4 that correspond to the corresponding transparent electrodes 2. The first electrodes of the thin film transistors 5 are connected to the corresponding transparent electrodes 2. The second electrodes of the two thin film transistors 5 that correspond to the two transparent electrodes 2 forming a same polygon are connected to the two adjacent data lines 3 respectively. Herein, the first electrodes can be one of the drain electrodes and the source electrodes in the thin film transistors 5, and the second electrodes can be the other of the drain electrodes and the source electrodes in the thin film transistors 5.

In a second aspect, an array substrate comprising the pixel structure according to any of the embodiments as described above is also provided.

In a third aspect, a display apparatus comprising the aforementioned color film substrate is further provided.

The display apparatus can further comprise a color film substrate aligned with the array substrate. With reference to FIGS. 5-8, the color film substrate comprises a plurality of color resistance blocks 6 that correspond to the plurality of subpixels in a one-to-one relationship to thereby realize the color displaying.

The color resistance blocks 6 and the transparent electrodes 2 in the corresponding subpixels are identical in shapes, and the color resistance blocks 6 corresponding to the same column of subpixels are identical in colors. If the gate lines 4 and the structures of the data lines 3 have structures as shown in FIG. 5, where a hexagonal area is formed between the $m^{th}$ and $(m+1)^{th}/(m-1)^{th}$ column of subpixels, the color resistance blocks 6 of the color film substrate have structures as illustrated in FIG. 6.

Figure 5:
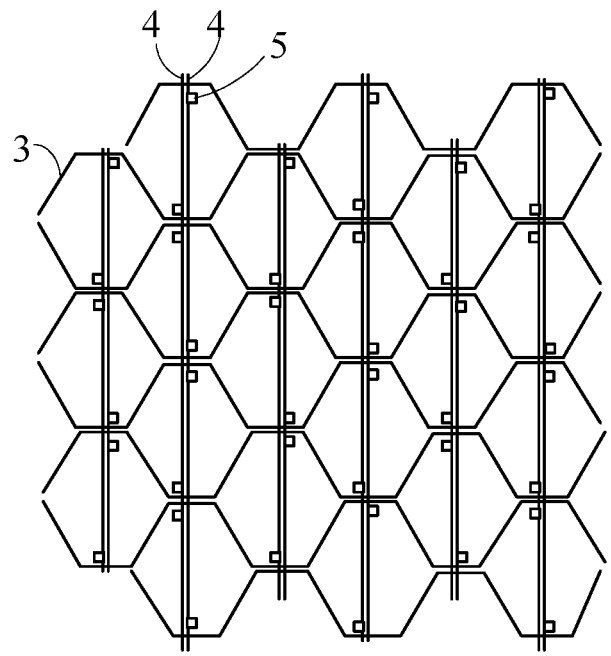
FIG. 5 is a diagram of the configuration of data lines and gate lines according to a first embodiment of the present disclosure.
Figure 6:
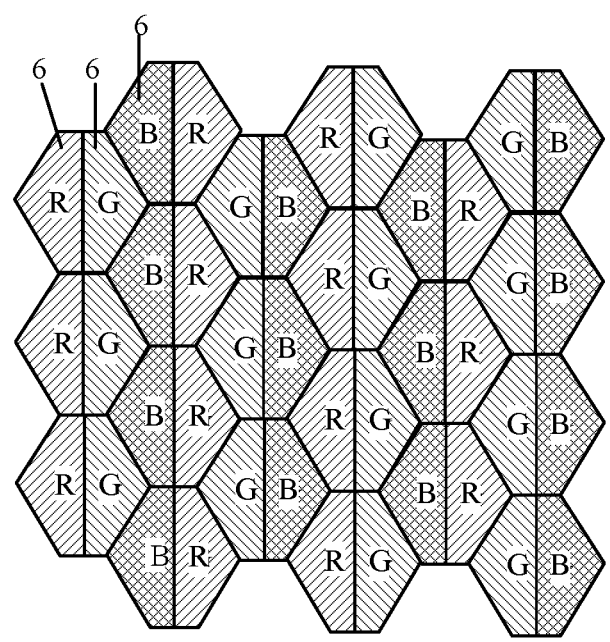
FIG. 6 is a structural diagram of the pixel structure corresponding to the configuration in FIG. 5.
Figure 7:
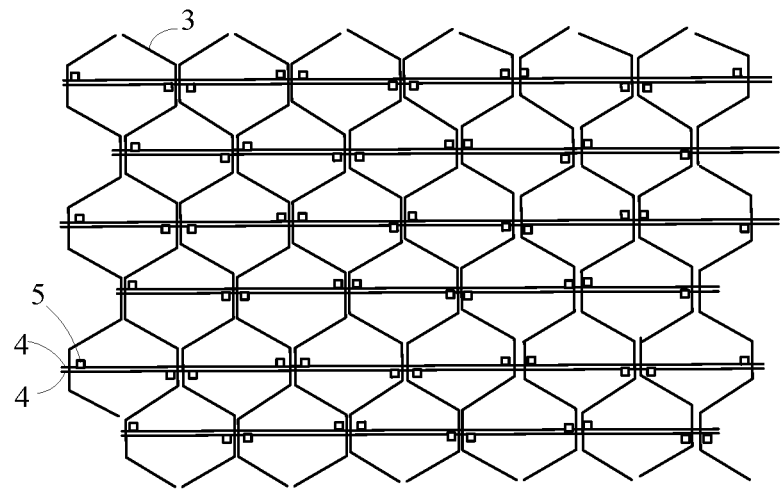
FIG. 7 is a diagram of the configuration of data lines and gate lines according to a second embodiment of the present disclosure.
Figure 8:
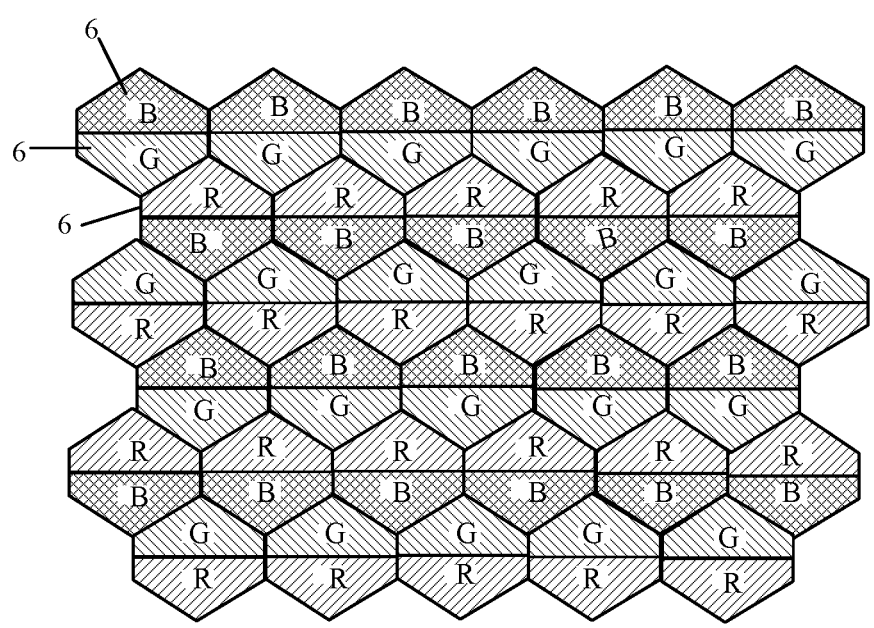
FIG. 8 is a structural diagram of the pixel structure corresponding to the configuration in FIG. 7.

As for a display apparatus with a relatively large lateral dimension, the pixel structure and corresponding configuration of data lines and gate lines as shown in FIG. 3 and FIG. 5 can be rotated by 90° to obtain the pixel structure and corresponding configuration of data lines and gate lines as shown in FIG. 7. Under this case, the gate lines 4 extend in the row direction. Correspondingly, the pixel structure as shown in FIG. 6 can be rotated by 90° to obtain the pixel structure as shown in FIG. 8. Color resistance blocks 6 in the same row are identical in color, so that the subpixels in the same row display the same color.

It can be understood by those skilled in the art that the display apparatus can further comprise a backlight source configured to provide backlight, a drive circuit configured to provide a drive signal and other structures. Detailed description is skipped herein.

Due to the facts that the transparent electrodes of the pixel structure are each of a multi-domain structure and that the slits in the two sub-electrode portions extend in different directions, the viewing angle of the display apparatus is improved and the color bias is reduced.

In addition, as the slits in at least one row of sub-electrode portions have at least two different directions, when the viewing direction is parallel to the long axes of the liquid crystal molecules corresponding to some of sub-electrode portions in the row, the viewing direction is not parallel to the long axes of the liquid crystal molecules corresponding to some other sub-electrode portions.

As such, the overall brightness of the area where this row of sub-electrode portions is located will not be too low, the issue of crossing stripes seen in some viewing directions for subpixels with relatively large dimensions is thereby reduced. Consequently, a good display effect can be achieved in all the viewing directions, and the viewing angle of the display apparatus is improved. Additionally, polygons can be formed among transparent electrodes of multiple columns of subpixels, to thereby allow the convenient manufacturing of round, polygonal, and other irregularly shaped displays.

Although specific embodiments have been described above in detail, the description is merely for purposes of illustration. It should be appreciated, therefore, that many aspects described above are not intended as required or essential elements unless explicitly stated otherwise. Various modifications of, and equivalent acts corresponding to, the disclosed aspects of the exemplary embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

The invention claimed is:

1. A pixel structure, comprising a plurality of transparent electrodes, arranged in columns and each corresponding to a subpixel, said pixel structure further comprising a plurality of gate lines and a plurality of data lines, wherein:
   each transparent electrode comprises at least two sub-electrode portions, each provided with a plurality of slits; and
   the plurality of transparent electrodes are arranged such that:
      slits in substantially a same column of sub-electrode portions have at least two different extending directions to thereby substantially reduce alternating light and dark stripes from some viewing angles in the same column during display; and that
      slits in substantially a same row of sub-electrode portions have at least two different extending directions to thereby substantially reduce alternating light and dark stripes from some viewing angles in the same row during display; and
   wherein:
   the plurality of transparent electrodes are arranged in pairs of columns, configured such that in each pair of columns, a first transparent electrode in a first column and a second transparent electrode in a second column on a same row form a corresponding pair of transparent electrodes, having a mirror symmetry along the column direction;
   two gate lines running in parallel in the column direction along the axis of symmetry between the pair of electrodes, each gate line corresponding to one electrode of the pair; and
   each data line takes a shape of a folded line, extending in a direction of a row and running along borders of every two staggered neighboring sub-pixels in the row.

2. The pixel structure of claim 1, wherein the pairs of columns are configured such that:
   slits in substantially a same row of sub-electrode portions in the first transparent electrode and in the second transparent electrode have at least two different extending directions.

3. The pixel structure of claim 2, wherein every two adjacent pairs of columns of transparent electrodes are arranged in a staggered configuration.

4. The pixel structure of claim 3, wherein in each corresponding pair of transparent electrodes, the first transparent electrode and the second transparent electrode together form a polygon, selected from a hexagon, a diamond, a pentagon, or an octagon.

5. The pixel structure of claim 4, wherein the polygon is a hexagon, and each transparent electrode comprises two sub-electrode portions, aligned in a column, wherein slits in each sub-electrode portion extend in a same direction.

6. The pixel structure of claim 5, wherein in each transparent electrode, slits in the two sub-electrode portions have extending directions in mirror symmetry along a direction of rows.

7. The pixel structure of claim 6, wherein in each transparent electrode, slits in one of the two sub-electrode portions are correspondingly connected to slits in another of the two sub-electrode portions in a one-to-one relationship.

8. The pixel structure of claim 7, wherein slits in the first transparent electrode and slits in the second transparent electrode are in mirror symmetry along a direction of columns.

9. The pixel structure of claim 8, wherein the hexagons together form a periodic structure, configured such that any two neighboring sub-electrode portions respectively from two staggered neighboring hexagons on two adjacent columns are on a same row.

10. The pixel structure of claim 9, wherein slits in each sub-electrode portion of each transparent electrode have an extending direction in parallel to sides of the each sub-electrode portion.

11. The pixel structure of claim 10, wherein:
   each data line takes a shape of a folded line, extending in a direction of a row and running along borders of every two staggered neighboring hexagons in the row.

12. The pixel structure of claim 11, further comprising a plurality of thin film transistors, wherein:
   each thin film transistor corresponds to a transparent electrode, wherein:
      a gate electrode of the each thin film transistor is coupled to a corresponding gate line;
      a source electrode of the each thin film transistor is coupled to a corresponding transparent electrode; and
      a drain electrode of the each thin film transistor is coupled to a corresponding data line.

13. The pixel structure of claim 12, wherein the plurality of transparent electrode each comprises ITO.

14. An array substrate, comprising the pixel structure according to claim 1.

15. A display apparatus, comprising the array substrate according to claim 14.

16. The display apparatus of claim 15, further comprising a color film substrate, disposed over the array substrate, wherein the color film substrate comprises a plurality of color resistance blocks, corresponding to the plurality of transparent electrodes in a one-to-one relationship.

17. The display apparatus of claim 16, wherein each color resistance block and a corresponding transparent electrode have a substantially same shape.

18. The display apparatus of claim 17, wherein the color resistance blocks corresponding to a same column of transparent electrodes are substantially identical in color.

* * * * *